United States Patent
Eubanks

(10) Patent No.: US 11,815,907 B2
(45) Date of Patent: Nov. 14, 2023

(54) GUIDED BALE WRAPPER

(71) Applicant: DEERE & COMPANY, Moline, IL (US)

(72) Inventor: Jason C. Eubanks, Hedrick, IA (US)

(73) Assignee: Deere & Company, Moline, IL (US)

( * ) Notice: Subject to any disclaimer, the term of this patent is extended or adjusted under 35 U.S.C. 154(b) by 175 days.

(21) Appl. No.: 17/248,904

(22) Filed: Feb. 12, 2021

(65) Prior Publication Data

US 2022/0261009 A1 Aug. 18, 2022

(51) Int. Cl.
*G05D 1/02* (2020.01)
*A01F 15/07* (2006.01)

(52) U.S. Cl.
CPC .... *G05D 1/0278* (2013.01); *A01F 2015/0725* (2013.01); *G05D 2201/0201* (2013.01)

(58) Field of Classification Search
CPC ......... G05D 1/0278; G05D 2201/0201; G05D 1/0212; A01F 2015/0725; A01F 15/071; A01F 15/07; A01D 90/10; A01D 90/08; A01D 90/00; A01D 41/1278
See application file for complete search history.

(56) References Cited

U.S. PATENT DOCUMENTS

| 4,793,124 A * | 12/1988 | Anderson ............. A01F 15/071 53/556 |
| 10,111,389 B2 * | 10/2018 | Kraus ................. A01F 15/0883 |
| 2017/0118918 A1 * | 5/2017 | Chaney ............... A01F 15/0883 |
| 2019/0053434 A1 * | 2/2019 | Reijersen Van Buuren ................ A01F 15/0883 |

OTHER PUBLICATIONS

Anderson, English brochure, pp. 1-148.
Tube Line, TL1000R Individual Round Bale Wrapper, retrieved from brochure, pp. 1-19.

* cited by examiner

*Primary Examiner* — Bao Long T Nguyen

(57) ABSTRACT

Systems and methods for controlling a path of a bale wrapping machine are disclosed. The systems and methods encompass automatically controlling a path traveled by a bale wrapping machine along a selected route as wrapped bales are deposited on the ground. The bale wrapping machine may use geospatial positioning information to control a steering system of the bale wrapping machine in order to track the selected route.

21 Claims, 4 Drawing Sheets

GUIDED BALE WRAPPER

FIELD OF THE DISCLOSURE

The present disclosure relates generally to bale wrapping machines.

BACKGROUND OF THE DISCLOSURE

In-line bale wrapping machines are utilized to wrap bales of crop material, such as cylindrical or "round" bales, to produce silage. The in-line bale wrappers can produce a column of wrapped bales, such as by wrapping a plurality of bales one after the other in series.

SUMMARY OF THE DISCLOSURE

A first aspect of the present disclosure is directed to a guided wrapping machine operable to wrap bales and deposit the wrapped bales along a defined path. The guided wrapping machine may include a platform; a wrapping assembly coupled to the platform and configured to wrap the received bale, the wrapping assembly comprising a drive system configured to advance a bale along the platform; a first transport component coupled to the platform; a steering system coupled to the first transport component, the first transport component moveable in response to the steering system to change a direction of travel of the guided wrapping machine; a global navigation satellite system (GNSS) receiver that receives global positioning information; and a controller communicably coupled to the GNSS receiver and the steering system, the steering system controlled by the controller to alter a direction traveled by the guided wrapping machine in response to the received global positioning information and a selected route received by the controller.

A second aspect of the present disclosure is directed to a method for arranging a series of wrapped bales in a desired configuration. The method may include wrapping a series of bales using a bale wrapping machine; advancing the bale wrapping machine along a selected route while depositing the series of wrapped bales onto a surface; and controlling a steering system of the bale wrapping machine to follow the selected route using received geospatial positioning information.

The various aspects of the present disclosure may include one or more of the following features. The steering system may include an actuator, and the actuator may be actuated in response to a signal of the controller based on a comparison between a current position of the bale wrapping machine and the selected route. The first transport component may include a pair of first transport components. The pair of first transport components may be located proximate to an end of the platform. A second transport component may be coupled to the platform. The second transport component may include a pair of second traction components, and the pair of second transport components may be located at an end of the platform. The selected route may include one of a linear portion or a curved portion. The controller may adjust the steering system automatically to cause the bale wrapping machine to follow the selected route as wrapped bales are deposited onto a surface. The wrapping assembly may include an inner hoop; an outer hoop; and a drive system that rotates the outer hoop relative to the inner hoop. A ram may be configured to advance the bale along the platform. Advancement of the bale along the platform by the ram may advance the guided wrapping machine along the ground.

The various aspects of the present disclosure may also include one or more of the following features. Geospatial positioning information may be received via a global navigation satellite system (GNSS) receiver. The bale wrapping machine may include a controller, and the controller may be communicably coupled to the steering system of the bale wrapping machine and the GNSS receiver. Controlling a steering system of the bale wrapping machine to follow the selected route using received geospatial positioning information may include controlling a steering system to cause the bale wrapping machine to follow the selected route. Controlling a steering system of the bale wrapping machine to follow the selected route may include actuating an actuator to alter a steering angle of a transport component of the bale wrapping machine. Controlling a steering system of the bale wrapping machine to follow the selected route may include comparing a current position of the bale wrapping machine to the selected route and actuating an actuator to alter a steering angle of a transport component of the bale wrapping machine to change a direction of travel of the bale wrapping machine when the current position compares unfavorably to the selected route. The bale wrapping machine may include a controller. Controlling a steering system of the bale wrapping machine to follow the selected route using received GNSS information may include utilizing the controller to automatically control the steering system of the bale wrapping machine. Advancing the bale wrapping machine along a selected route while depositing the series of wrapped bales onto a surface may include simultaneously advancing a bale along a platform of the bale wrapping machine while advancing the bale wrapping machine along the selected route. Wrapping a series of bales using a bale wrapping machine may occur simultaneously with advancing the bale wrapping machine along a selected route while depositing the series of wrapped bales onto a surface.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
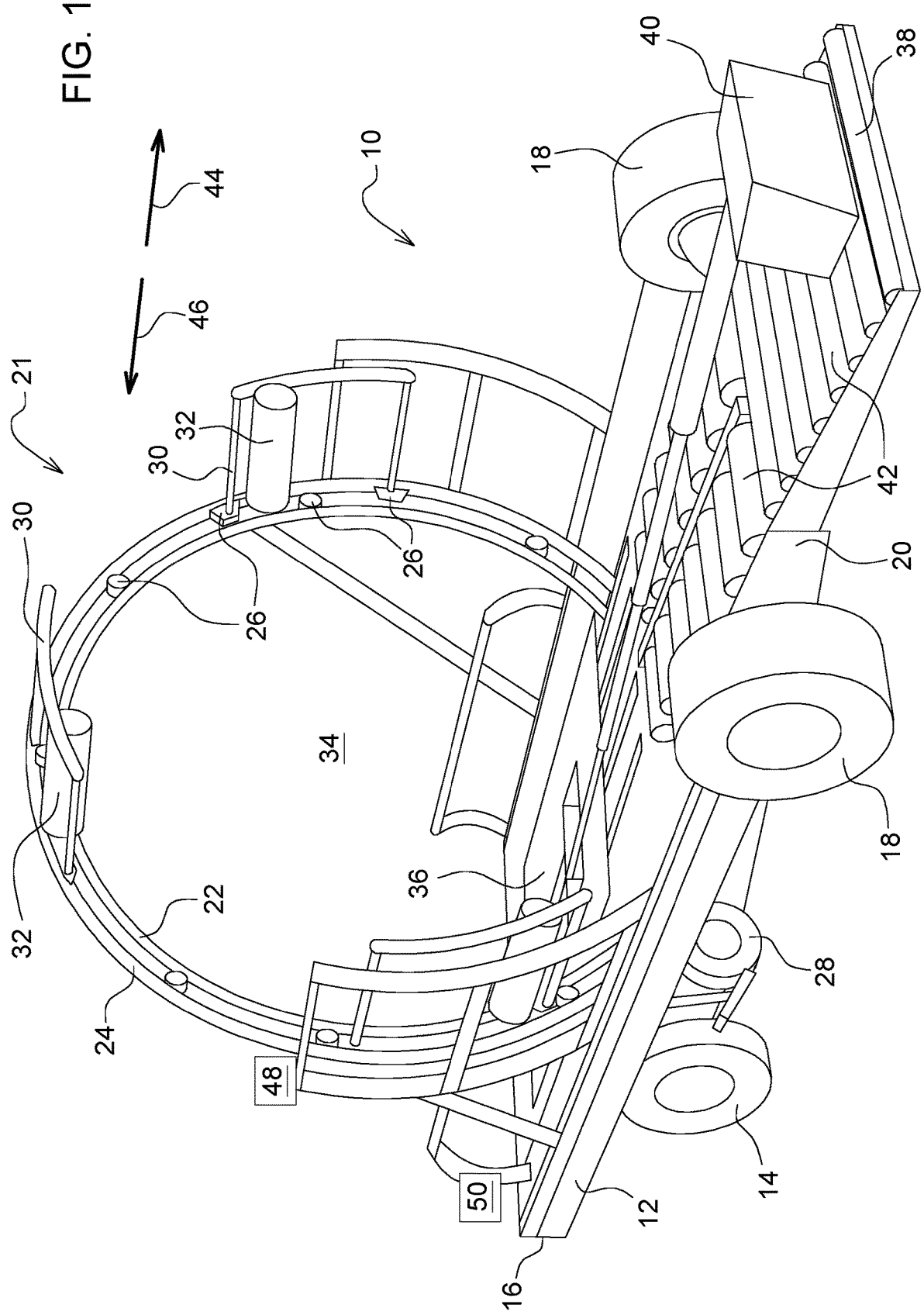
FIG. 1 is a perspective view of an example bale wrapping machine, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

FIG. 1 is a perspective view of an example in-line bale wrapping machine 10. Although the present disclosure is made in the context of in-line bale wrapping machines, the scope of the present disclosure is not so limited. Rather, the present disclosure encompasses wrapping machines for wrapping other items or different types of material. Thus, the scope of the present disclosure encompasses wrapping devices outside of the agricultural arts.

The in-line bale wrapping machine 10 includes a frame 12, a first set of transport components 14 disposed proximate a first end 16 of the frame 12, and a second set of transport components 18 disposed proximate a second end 20 of the frame 12. In the illustrated example, the first and second sets of transport components 14 and 18 are wheel and tire assemblies. In other implementations, one or both of the first and second sets of transport components 14 and 18 are other types of transport components, such as tracks or skis. In some implementations, one or both of the first and second sets of transport components 14 and 18 are powered to propel the in-line bale wrapping machine 10 along the ground. Further, one or both of the sets of transport components 14 and 18 are steerable to control a direction of travel of the in-line bale wrapping machine 10. The transport components 14 and 18 facilitate propulsive movement of the in-line bale wrapping machine 10 over the ground.

The in-line bale wrapping machine 10 also includes a wrapping assembly 21. The wrapping assembly includes an inner hoop 22, an outer hoop 24, and a wrap drive system 28. The inner hoop 22 is fixedly coupled to the frame 12. The outer hoop 24 includes a plurality of wheels 26 that ride on the inner hoop 22. Consequently, the outer hoop 24 is rotatable on and relative to the inner hoop 22. The outer hoop 24 is propelled by the wrap drive system 28. In the illustrated example, the wrap drive system 28 includes a wheel 29 and a power source that drives the wheel 29. In other implementations, the wrap drive system 28 includes other devices operable to move the outer hoop 24 relative to the inner hoop 22. In some implementations, the power source of the wrap drive system 28 includes a motor, such as an electric motor; an engine, such as an internal combustion engine; a pump and hydraulic motor combination; or another type of power source operable to power the wrap drive system 28 and, thus, operate the wrapping assembly 21.

The outer hoop 24 also includes mounts 30. Wrapping material 32 used to wrap bales is coupled to the mounts 30. As a bale is passed through the interior 34 of the inner hoop 22, the outer hoop 24 is rotated about the inner hoop 22 by the wrap drive system 28, and the wrapping material 32 is wrapped around the bale.

The in-line bale wrapping machine 10 also includes a platform 36 and a ramp 38 pivotably coupled to the platform 36. Bales are received onto and slide along the platform 36 during wrapping. The bales are also slid along the ramp 38 (when the ramp is in a deployed condition) to expel the wrapped bale from the in-line bale wrapping machine 10. The in-line bale wrapping machine 10 also includes a ram 40 that is extendable and retractable. In some implementations, the ram 40 is hydraulically operated. However, in other implementations, the ram 40 is operated in other ways. For example, in other instances, the ram 40 is operated pneumatically or electrically. The ram 40 is extended to push the bales along the platform 36 and ramp 38 as the bale is wrapped. A plurality of rollers 42 are provided on the platform 36 and on a portion of the ramp 38. The rollers 42 facilitate movement of the wrapped bales along the in-line bale wrapping machine 10 and for subsequent deposition of the wrapped bales onto the ground.

Further, in some implementations, a motion of the ram 40 in the direction of arrow 44 (corresponding to extension of the ram 40) causes the in-line bale wrapping machine 10 to be moved along the ground. Thus, as the ram 40 extends to push a bale through the interior 34 of the inner hoop 22, this movement of the ram 40 propels the in-line bale wrapping machine 10 forward in the direction of arrow 46 along the ground. As a line of wrapped bales is expelled from the ramp 38 of the in-line bale wrapping machine 10, the friction produced between the deposited wrapped bales and the ground prevents the line of wrapped bales from being displaced relative to the ground by the ram 40. Consequently, extension of the ram 40 in the direction of arrow 44 causes the in-line bale wrapping machine 10 to be displaced in the direction of arrow 46. Thus, in some instances, a horizontal position of a bale relative to the ground remains unchanged as the bale is being displaced by the ram 40 and being wrapped by the wrapping assembly 21. Wrapped bales are deposited onto the ground from the ramp 38 as additional bales are placed on the platform 36 for wrapping. Prior to placement onto the platform 36 of a new bale for wrapping, the ram 40 is retracted. With a new bale in position on the platform 36, the ram 40 is again extended to push the new bale along the platform 36 and through the interior 34 of the inner hoop 22 as the wrapping assembly 21 is operated to wrap the new bale with the wrapping material 32. The series of bales deposited onto the in-line bale wrapping machine 10 is wrapped continuously, as opposed to the bales being wrapped individually. Thus, the in-line bale wrapping machine 10 is operable to wrap continuously a plurality wrapped bales and deposit the plurality of wrapped bales in a continuous column onto the ground. However, in some implementations, the in-line bale wrapping machine 10 is operable to wrap bales individually.

Figure 2:
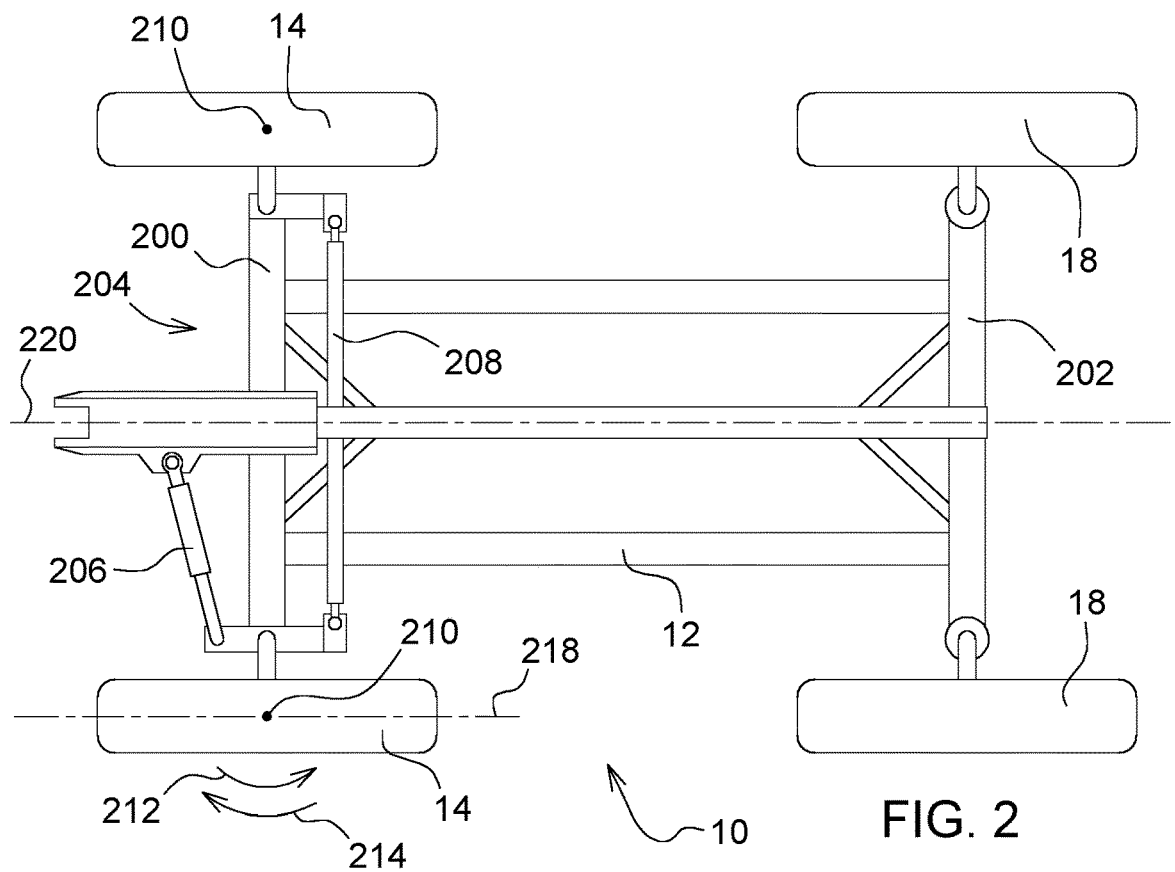
FIG. 2 is a detail view of a portion of the bale wrapping machine of FIG. 1.

As mentioned earlier, one or both sets of the transport components 14 and 18 are steerable to control a direction of travel of the in-line bale wrapping machine 10 over the ground. FIG. 2 is a detail view of a portion of the in-line bale wrapping machine 10. FIG. 2 shows the first and second sets of transport components 14 and 18, a portion of the frame 12, a front axle 200, a rear axle 202, and a steering system 204 operable to steer the transport components 14. Although the illustrated example shows the steering system 204 does not steer both sets of transport components 14 and 18, in other implementations, the steering system 204 is operable to control both sets of transport control devices 14 and 18 or includes a second steering system that is operable to steer the transport components 18. Thus, in some implementations, both sets of transport components 14 and 18 are steerable.

In the illustrated example, the steering system 204 includes an actuator 206 that is coupled to a one of the transport components 14 and a connecting rod 208. When the actuator 206 is extended, the transport components 14 are pivoted about axes 210 in the direction of arrow 212. When the actuator 206 is retracted, the transport components 14 are pivoted about axes 210 in the direction of arrow 214. The connecting rod 208 transmits rotational movement from one transport component 14 to the other. Thus, extension or retraction of the actuator 206 alters a steering angle defined between a centerline 218 of the transport components 14 and a centerline 220 of the frame 12. The extension and retraction of the actuator 206 results in both transport components 14 and 18 being pivoted in the same direction to control a direction of the in-line bale wrapping machine 10. In some implementations, the actuator 206 may be a linear actuator, a rotary actuator, or another type of actuator operable to pivot the transport components 14, 18, or both. For example, the actuator 206 encompasses hydraulic actuator, electric actuators, and pneumatic actuators.

Returning to FIG. 1, the in-line bale wrapping machine 10 also includes a global navigation satellite system (GNSS) receiver 48 and a controller 50. The GNSS receiver receives geospatial positioning information from a satellite navigation system, such as the Global Positioning System (GPS); BeiDou Navigation Satellite System (BDS); Galileo; GLO-NASS; Indian Regional Navigation Satellite System (IRNSS); Navigation Indian Constellation (NavIC); and Quasi-Zenith Satellite System (QZSS). The received geospatial positioning information is used, for example, to identify a georeferenced position of the in-line bale wrapping machine 10 and to control a course traveled by the in-line bale wrapping machine 10 as a series of bales are wrapped and deposited onto the ground in a continuous column. The geospatial positioning information is used by the controller 50 to control a course or path traveled by the in-line bale wrapping machine 10 as the series of bales are wrapped and deposited onto the ground.

By controlling the route traveled by the in-line bale wrapping machine 10 while wrapping and depositing the series of bales, a shape formed by the deposited column of wrapped bales is controllable. For example, forming a column of wrapped bales in a straight line is a challenge using current in-line bales wrapping machines. Generally, control of these current machines is provided by an operator, particularly with respect to forming a first wrapped series of bales at a location. Control of current machines in this way results in the production of column of wrapped bales that is wavy, bent, askew, or otherwise does not form a straight line. This type of uncontrolled column of wrapped bales is undesirable, as such a column of bales may result in fewer bales being located in a defined space. Moreover, such columns of wrapped bales simply do not conform to the desires of the operator.

The in-line wrapping machines of the present disclosure allow a defined course or route to be traveled while forming a column of wrapped bales. Further, the course traveled and, consequently, the shape of the resulting column of wrapped bales is not limited to a particular shape but can be any desired shape, such as a straight shape, a curved shape, or a path having one or more straight portions and one or more curved portions. Thus, if an operator desires that the wrapped series of bales form a straight line along the ground, such a course is inputted into or otherwise received by the controller 50, and the controller 50 controls the steering system of the in-line bale wrapping machine 10 (such as steering system 204 described earlier) to maintain the in-line bale wrapping machine 10 along the selected route as the bales are wrapped and deposited on the ground. Although a straight paths are contemplated, the scope of the present disclosure encompasses a path having any desired shape. As a result, the in-line bale wrapping machine 10 can be controlled with the precision provided by geospatial positioning information to produce a column of wrapped bales having any desired shape.

Figure 3:
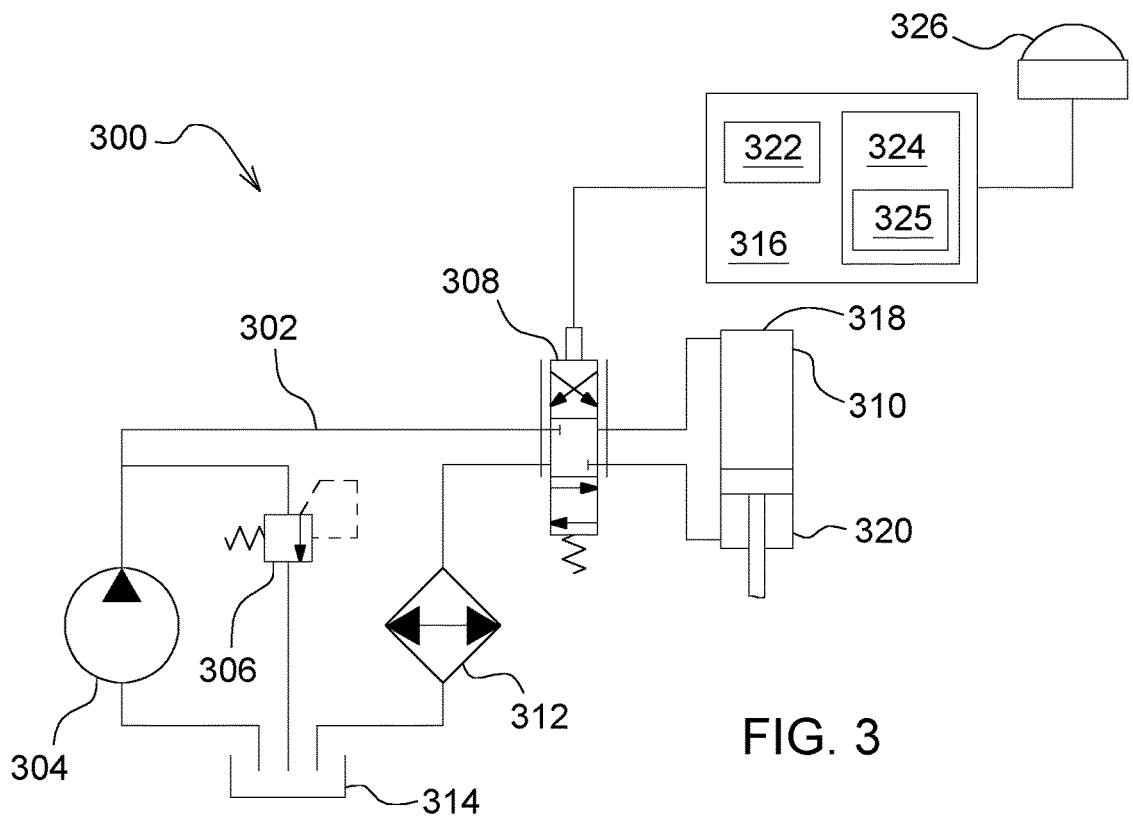
FIG. 3 is a schematic diagram of an example steering control system that is used to control a steering system of a bale wrapping machine, according to some implementations of the present disclosure.

FIG. 3 is a schematic diagram of an example steering control system 300 that is used to control a steering system (such as steering system 204) of an in-line bale wrapping machine (such as in-line bale wrapping machine 10). The control system 300 includes a hydraulic circuit 302 that includes a pump 304, a bypass valve 306, a flow control valve 308, an actuator 310, a filter 312, and a sump 314. A hydraulic fluid is provided in the sump 314. The pump 304 draws the hydraulic fluid from the sump 314 and pumps the hydraulic fluid through the hydraulic circuit 302. In some implementations, the pump 304 is a positive displacement pump. However, the scope of the present disclosure is not limited to positive displacement pumps. Thus, in other implementations, other types of pumps can be used.

In the illustrated example, the actuator 310 is a hydraulic cylinder. However, in other implementations, as described earlier, other types of actuators can be used and are within the scope of the present disclosure. For example, in some implementations, electrical or pneumatic linear actuators are used.

The pump 304 pumps the hydraulic fluid to the flow control valve 308. In the illustrated example, the flow control valve 308 is a proportional, three-position (or three-configuration) solenoid operated valve. In other implementations, other types of valves may be used. For example, in some implementations, the steering control system 300 includes a solenoid operated valve that is not a proportional valve. Still further, other types of valves operable to control a flow of hydraulic fluid to and from the actuator are usable. The flow control valve 308 is moveable between three configurations. A first, default configuration (shown in FIG. 3) prevents fluid flow to or from the actuator 310. A second configuration of the flow control valve 308 permits fluid flow to a first end 318 of the actuator 310 and fluid flow from a second end 320 of the actuator 310, resulting in extension of the actuator 310. A third configuration of the flow control valve 308 permits fluid flow to the second end 320 of the actuator 310 and fluid flow from the first end 318 of the actuator 310, resulting in retraction of the actuator 310. Because the illustrated flow control valve 308 is a proportional valve, in each of the second and third configurations, an amount by which the valve is opened to allow fluid flow is adjustable to alter a flow rate of the fluid passing through the flow control valve 308 and, thus, as speed at which the actuator 310 reacts. In other implementation, the flow control valve 308 is not a proportional valve.

The steering control system 300 also includes a controller 316. In some implementations, the controller 316 forms or includes a computer system, such as the computer system 500, described in more detail below. Additional details of the controller 316, such as processor 322 and memory 324, are included below in the context of computer system 500.

The controller 316 includes the processor 322 that is communicatively coupled to the memory 324. The memory 324 communicates with the processor 322 and is used to store programs and other software, information, and data. The processor 322 is operable to execute programs and software and receive information from and send information to the memory 324. Although a single memory 324 and a single processor 322 are illustrated, in other implementations, a plurality of memories, processors, or both may be used. Although the processor 322 and the memory 324 are shown as being local components of the controller 316, in other implementations, one or both of the processor 322 and memory 324 may be located remotely. Software 325, such as in the form of an application or program, is executed by the processor 322 to control operation of the steering control system 300, as described in more detail below.

The controller 316 is communicably coupled to the flow control valve 308 (for example, via a wired or wireless connection) and sends signals to the flow control valve 308 to control a position of the flow control valve 308. In the illustrated example, because the flow control valve 308 is a proportional valve, the controller 316 controls a position of the flow control valve 308 to control both how hydraulic fluid is delivered to the actuator 310 as well as a flow rate at which the hydraulic fluid flow is provided to the actuator 310. For example, in the illustrated position, the flow control valve 308 is in the first configuration in which hydraulic fluid is prevented from flowing through the flow control valve 308. As a result, a configuration of the actuator 310 is maintained, and a length of the actuator 310 is maintained. In the first configuration, the steering angle of an in-line bale wrapping machine remains unchanged. In the context of FIG. 2, with the flow control valve 308 in the first configuration, a length of the actuator 206 remains unchanged, and the transport components 14 are not pivoted about axes 210.

Returning to FIG. 3, when the flow control valve 308 is in the second configuration, hydraulic fluid is directed from the pump 304 to the first end 318 of the actuator 310 and from the second end 320 of the actuator 310. As a result, the actuator 310 is extended. In the context of FIG. 2, extension of the actuator 206 results in rotation of the transport components 14 about axes 210 in the direction of arrow 212. Returning to FIG. 3, within this first configuration, the controller 316 is also operable to adjust an amount by which the flow control valve 308 is open, thereby altering a flow rate at which the hydraulic fluid is permitted to pass through the flow control valve 308. This, in turn, alters a rate at which the actuator 310 extends. The controller 316 is also operable to move the flow control valve into the second configuration in which the hydraulic fluid flow produced by the pump 304 is directed to the second end 320 of the actuator, and hydraulic fluid from the first end 318 of the actuator 310 is directed to the sump 314. As a result, the actuator 310 is retracted. In the context of FIG. 2, retraction of the actuator 206 causes the transport components 14 to rotate about axes 210 in the direction of arrow 214. Returning to FIG. 3, similar to the first configuration, the controller 316 is also operable to adjust an amount by which the flow control valve 308 is open in the second configuration, which results in altering a flow rate of the hydraulic fluid flow through the flow control valve 308. This, in turn, alters a rate at which the actuator 310 retracts. Therefore, the controller 316 is operable to control the flow control valve 308 to control whether the flow control valve 308 permits passage of hydraulic fluid therethrough, whether the actuator 310 is extended or retracted, and a rate at which the actuator 310 is extended or retracted. Consequently, via the actuator 310 and flow control valve 308, the controller 316 is operable to control steering of an in-line bale wrapping machine (e.g., whether a steering input is made and a direction in which the steering input is made) as well as the responsiveness of the steering of the in-line bale wrapping machine.

The steering control system 300 also includes a GNSS receiver 322 that is communicably coupled to the controller 316. The controller 316 and the GNSS receiver 322 may be coupled via a wired or wireless connection. The controller 316 receives geospatial positioning information from the GNSS receiver 326. In the illustrated example, the software 325 includes instructions that, when executed by the processor 322 of the controller 316, causes the controller 316 to control the various components of the steering control system 300 to control a steering of an in-line bale wrapping system so as to maintain a course of travel of the in-line bale wrapping system. The course of travel to be maintained is defined by a selected route that is input into, stored on, or otherwise received by the controller 316. The selected route includes geospatial information that is useable to map the course onto a location on the Earth.

In operation, the controller 316 receives the geospatial positioning information from the GNSS receiver 326. The received geospatial positioning information is used to identify a location of the in-line bale wrapping machine at a location on the Earth. Thus, the controller 316 is able to determine a present location of the in-line bale wrapping machine at any given instant. By extension, the controller 316 is able to detect a position of the wrapped bales as the wrapped bales are being deposited onto the ground. In this way, a shape formed by the deposited wrapped bales and the corresponding locations along the ground of the deposited wrapped bales are also determinable. The controller 316 compares the current position of the in-line bale wrapping machine to the geospatial positioning information of the selected route that defines the selected path along the ground. If the current position of the in-line bale wrapping machine compares unfavorably to the geospatial positioning information of the selected route, the controller identifies a variance between the current position and the selected route and generates control signals that are transmitted to the flow control valve 308. In some implementations, an unfavorable comparison indicates that the current position does not correspond to a location along the selected route. In some implementations, a current position of the bale wrapping machine satisfies the selected route if the current position lies along the selected route or if the current position is within a selected variance from the selected route. For example, in some implementations, a selected variance corresponds to an amount of variation from the selected route, such as from one or both sides of the selected route. This selected amount of variation forms a zone around the selected course, and, if the current position of the bale wrapping machine is located within this zone, the bale wrapping machine is deemed to be following the selected route, and a favorable comparison results. A selected amount of variation from the selected route may include, for example, a 0.2 inches (in.) (5.0 millimeters (mm)), 0.39 in. (10.0 mm), or 0.79 in. (20.0 mm) of lateral variation from the geospatial positioning information that defines the selected route. Although some example values are presented, the amount of variance may be any selected value.

The control signals define a position of the flow control valve 308, e.g., whether the flow control valve 308 is in the first configuration, the second configuration, or the third configuration and, in the illustrated example, an amount by which the flow control valve 308 is open to control a fluid flow rate through the flow control valve 308. As a result, the controller 316 controls extension and retraction of the actuator 310 and, consequently, a steering system of the in-line bale wrapping machine to maintain travel of the in-line bale wrapping machine along the selected route. By providing this type of control, the controller 316 functions to control the in-line bale wrapping machine to produce a column of wrapped bales having a shape that corresponds to the selected route and at a location along the ground as defined by the geospatial positioning information contained in the selected route.

Hydraulic fluid returning from the actuator 310 passes through the filter 312 and returns to the sump 314. The filter 312 removes contamination from the hydraulic fluid. In some implementations, the filter 312 is omitted. The bypass valve 306 operates to open if the pressure of the pumped hydraulic fluid meet or exceeds a selected pressure value. If the pressure of the pumped hydraulic fluid meets or exceeds the selected pressure value, the bypass valve 306 opens and returns the hydraulic fluid to the sump 314. In some implementations, the bypass valve 306 is omitted.

Control of an in-line bale wrapping machine (or any type of wrapping machine within the scope of the present disclosure) in this way provides for precisely controlling how and where a series of wrapped bales is deposited on the ground. Consequently, control of an in-line bale wrapping machine as described herein allows an operator to precisely define a shape of a column of wrapped bales deposited on the ground and precisely locate that column of wrapped bales along the ground. Thus, the present disclosure provides for improved control of bale wrapping, conserves space, and provides for more efficient storage of wrapped bales.

Figure 4:
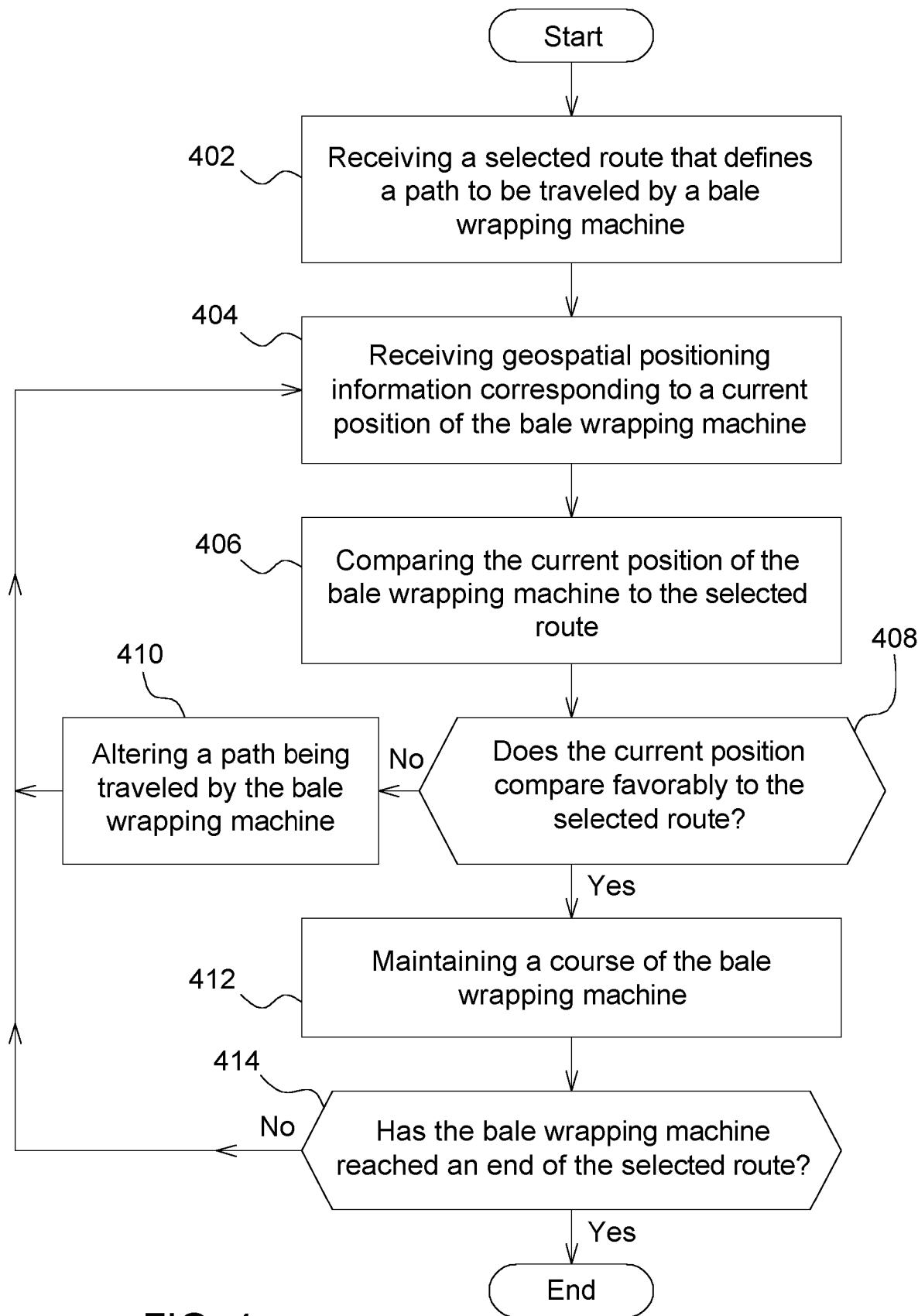
FIG. 4 is a flowchart of an example method of controlling travel of a bale wrapping machine along a selected route, according to some implementations of the present disclosure.

FIG. 4 is a flowchart of an example method 400 of controlling travel of a bale wrapping machine, such as an in-line bale wrapping machine, along a selected route. At 400, a route to be traveled by the bale wrapping machine is received. For example, at 402, a selected route that defines a path to be traveled by a bale wrapping machine as bales are wrapped and deposited onto the ground is received by a controller, such as a controller of the bale wrapping machine. For example, the controller may be similar to the controller 316 described earlier. At 404, geospatial positioning information corresponding to a current position of the bale wrapping machine is received. In some implementations, the controller of the bale wrapping machine receives the geospatial positioning information via a GNSS receiver. At 406, a current position of the bale wrapping machine is compared to the selected route. For example, the controller of the bale wrapping machine compares the current position of the bale wrapping machine, as determined using the geospatial positioning information, and compares that current position to the geospatial positioning information associated with the selected route. At 408, a determination is made as to whether the current position of the bale wrapping machine compares favorably to the selected route. As indicated earlier, a favorable comparison occurs when the current position is located on or is within a selected variance of the selected route. If the current position is not located on or within a selected variance of the selected route, at 410, the path being traveled by the bale wrapping machine is altered. For example, the controller sends signals to a steering system of the bale wrapping machine to alter a steering angle of the steering system and, consequently, alter the path traveled by the bale wrapping machine. The method 400 returns to 404 where geospatial positioning information associated a new current position of the bale wrapping machine is received, and the method 400 continues therefrom.

If the current position of the bale wrapping machine is located along the selected route, then the method 400 moves to 412 where a course of the bale wrapping machine is maintained. Maintaining a course of the bale wrapping machine includes, for example, maintaining a position of the steering system of the bale wrapping machine so that the course being traveled remains unaltered. As a result, a direction of travel of the bale wrapping machine remains unchanged. At 414, a determination is made as to whether the bale wrapping machine has reached an end of the selected route. For example, in some implementations, the controller of the bale wrapping machine compares an end of the selected route to the current position of the bale wrapping machine using the geospatial positioning information. If the bale wrapping machine is not located at the end of the selected route, then the method 400 returns to 404, and the method 400 proceeds therefrom. If the bale wrapping machine has reached the end of the selected route, then method 400 ends.

Without in any way limiting the scope, interpretation, or application of the claims appearing below, a technical effect of one or more of the example implementations disclosed herein is to provide improved control over a course traveled by a bale wrapping machine during the course of producing a column of wrapped bales. Another technical effect of one or more of the example implementations disclosed herein is automatically controlling a course traveled by a bale wrapping machine in order to produce a column of wrapped bales in a desired shape.

Figure 5:
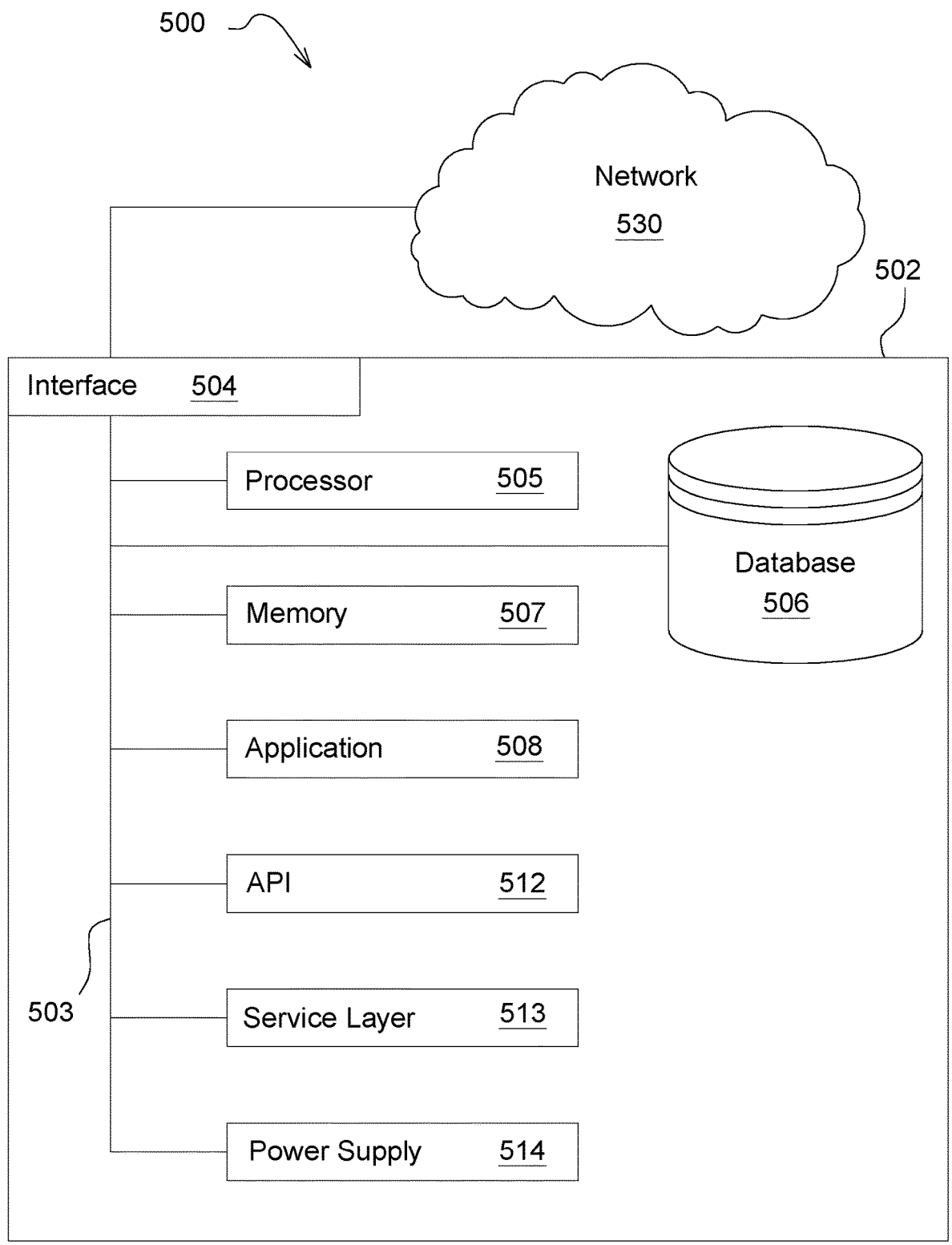
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes: causing a bale wrapping machine to wrap a series of bales; advancing the bale wrapping machine along a selected route while depositing the series of wrapped bales onto a surface; and controlling a steering system of the bale wrapping machine to follow the selected route using received geospatial positioning information.

The foregoing and other described implementations can each, optionally, include one or more of the following features:

A first feature, combinable with any of the following features, the method further including receiving the geospatial positioning information via a global navigation satellite system (GNSS) receiver.

A second feature, combinable with any of the previous or following features, wherein the bale wrapping machine includes a controller, and wherein the controller in communicably coupled to the steering system of the bale wrapping machine and the GNSS receiver.

A third feature, combinable with any of the previous or following features, wherein controlling a steering system of the bale wrapping machine to follow the selected route using received geospatial positioning information includes controlling a steering system to cause the bale wrapping machine to follow the selected route.

A fourth feature, combinable with any of the previous or following features, wherein controlling a steering system of the bale wrapping machine to follow the selected route includes actuating an actuator to alter a steering angle of a traction component of the bale wrapping machine.

A fifth feature, combinable with any of the previous or following features, wherein controlling a steering system of the bale wrapping machine to follow the selected route includes comparing a current position of the bale wrapping machine to the selected route and actuating an actuator to alter a steering angle of a traction component of the bale wrapping machine to change a direction of travel of the bale wrapping machine when the current position compares unfavorably to the selected route.

A sixth feature, combinable with any of the previous or following features, wherein the bale wrapping machine includes a controller, and wherein controlling a steering system of the bale wrapping machine to follow the selected route using received GNSS information includes utilizing the controller to automatically control the steering system of the bale wrapping machine.

A seventh feature, combinable with any of the previous or following features, wherein advancing the bale wrapping machine along a selected route while depositing the series of wrapped bales onto a surface includes advancing a bale along a platform of the bale wrapping machine and advancing the bale wrapping machine along the selected route simultaneously.

An eighth feature, combinable with any of the previous features, wherein wrapping a series of bales using a bale wrapping machine occurs simultaneously with advancing the bale wrapping machine along a selected route while depositing the series of wrapped bales onto a surface.

In a second implementation, a non-transitory, computer-readable medium storing one or more instructions executable by a computer system to perform operations including: causing a bale wrapping machine to wrap a series of bales; advancing the bale wrapping machine along a selected route while depositing the series of wrapped bales onto a surface; and controlling a steering system of the bale wrapping machine to follow the selected route using received geospatial positioning information.

The foregoing and other described implementations can each, optionally, include one or more of the following features:

A first feature, combinable with any of the following features, the computer-readable medium further storing one or more instructions executable by a computer system to perform operations including receiving the geospatial positioning information via a global navigation satellite system (GNSS) receiver.

A second feature, combinable with any of the previous or following features, wherein the bale wrapping machine includes a controller, and wherein the controller in communicably coupled to the steering system of the bale wrapping machine and the GNSS receiver.

A third feature, combinable with any of the previous or following features, wherein controlling a steering system of the bale wrapping machine to follow the selected route using received geospatial positioning information includes controlling a steering system to cause the bale wrapping machine to follow the selected route.

A fourth feature, combinable with any of the previous or following features, wherein controlling a steering system of the bale wrapping machine to follow the selected route includes actuating an actuator to alter a steering angle of a traction component of the bale wrapping machine.

A fifth feature, combinable with any of the previous or following features, wherein controlling a steering system of the bale wrapping machine to follow the selected route includes comparing a current position of the bale wrapping machine to the selected route and actuating an actuator to alter a steering angle of a traction component of the bale wrapping machine to change a direction of travel of the bale wrapping machine when the current position compares unfavorably to the selected route.

A sixth feature, combinable with any of the previous or following features, wherein the bale wrapping machine includes a controller, and wherein controlling a steering system of the bale wrapping machine to follow the selected route using received GNSS information includes utilizing the controller to automatically control the steering system of the bale wrapping machine.

A seventh feature, combinable with any of the previous or following features, wherein advancing the bale wrapping machine along a selected route while depositing the series of wrapped bales onto a surface includes advancing a bale along a platform of the bale wrapping machine and advancing the bale wrapping machine along the selected route simultaneously.

An eighth feature, combinable with any of the previous features, wherein wrapping a series of bales using a bale wrapping machine occurs simultaneously with advancing the bale wrapping machine along a selected route while depositing the series of wrapped bales onto a surface.

In a third implementation, a computer-implemented system, comprising one or more processors and a non-transitory computer-readable storage medium coupled to the one or more processors and storing programming instructions for execution by the one or more processors, the programming instructions instructing the one or more processors to: cause a bale wrapping machine to wrap a series of bales; advance the bale wrapping machine along a selected route while depositing the series of wrapped bales onto a surface; and control a steering system of the bale wrapping machine to follow the selected route using received geospatial positioning information.

The foregoing and other described implementations can each, optionally, include one or more of the following features:

A first feature, combinable with any of the following features, the one or more programming instructions further including programming instructions instructing the one or more processors to receive the geospatial positioning information via a global navigation satellite system (GNSS) receiver.

A second feature, combinable with any of the previous or following features, wherein the bale wrapping machine includes a controller, and wherein the controller in communicably coupled to the steering system of the bale wrapping machine and the GNSS receiver.

A third feature, combinable with any of the previous or following features, wherein the programming instructions instructing the one or more processors to control a steering system of the bale wrapping machine to follow the selected route using received geospatial positioning information includes programming instructions instructing the one or more processors to control a steering system to cause the bale wrapping machine to follow the selected route.

A fourth feature, combinable with any of the previous or following features, wherein the programming instructions instructing the one or more processors to control a steering system of the bale wrapping machine to follow the selected route includes programming instructions instructing the one or more processors to actuate an actuator to alter a steering angle of a traction component of the bale wrapping machine.

A fifth feature, combinable with any of the previous or following features, wherein the programming instructions instructing the one or more processors to control a steering system of the bale wrapping machine to follow the selected route includes programming instructions instructing the one or more processors to compare a current position of the bale wrapping machine to the selected route and actuating an actuator to alter a steering angle of a traction component of the bale wrapping machine to change a direction of travel of the bale wrapping machine when the current position compares unfavorably to the selected route.

A sixth feature, combinable with any of the previous or following features, wherein the bale wrapping machine includes a controller, and wherein the programming instructions instructing the one or more processors to control a steering system of the bale wrapping machine to follow the selected route using received GNSS information includes programming instructions instructing the one or more processors to utilize the controller to automatically control the steering system of the bale wrapping machine.

A seventh feature, combinable with any of the previous or following features, wherein the programming instructions instructing the one or more processors to advance the bale wrapping machine along a selected route while depositing the series of wrapped bales onto a surface includes the programming instructions instructing the one or more processors to advance a bale along a platform of the bale wrapping machine and to advance the bale wrapping machine along the selected route simultaneously.

An eighth feature, combinable with any of the previous features, further including programming instructions instructing the one or more processors to wrap a series of bales using a bale wrapping machine and advance the bale wrapping machine along a selected route while depositing the series of wrapped bales onto a surface occur simultaneously.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses. Example wireless communication within the scope of the present disclosure include wireless communication that utilize wireless protocols, such as 802.15 protocols (e.g., a BLUETOOTH®), 802.11 protocols, 802.20 protocols (e.g., WI-FI®), a combination of one or more of these wireless protocols, or different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A guided wrapping machine operable to wrap bales and deposit the wrapped bales along a defined path, the guided wrapping machine comprising:
    a platform configured to receive a bale;
    a wrapping assembly coupled to the platform and configured to wrap the received bale, the wrapping assembly comprising:
        an inner hoop; and
        an outer hoop rotatable on and about the inner hoop;
    a wheel coupled to the platform;
    an actuator coupled to the wheel, the wheel moveable in response to the actuator to change a direction of travel of the guided wrapping machine;
    a global navigation satellite system (GNSS) receiver that receives global positioning information; and
    a controller communicably coupled to the GNSS receiver and the steering system, the steering system controlled by the controller to alter a direction traveled by the guided wrapping machine in response to the received global positioning information and a selected route received by the controller.

2. The guided wrapping machine of claim 1, wherein the actuator is actuated in response to a signal of the controller based on a comparison between a current position of the bale wrapping machine and the selected route.

3. The guided wrapping machine of claim 1, wherein the wheel is a first wheel and further comprising a second wheel.

4. The guided wrapping machine of claim 3, wherein the first wheel and the second wheel are located proximate to an end of the platform.

5. The guided wrapping machine of claim 3, wherein the first wheel and the second wheel are coupled with a connecting rod.

6. The guided wrapping machine of claim 1, further comprising a second wheel coupled to the platform.

7. The guided wrapping machine of claim 6, wherein the first wheel and the second wheel are located at an end of the platform.

8. The guided wrapping machine of claim 1, wherein the selected route comprises at least one of a linear portion or a curved portion.

9. The guided wrapping machine of claim 1, wherein the controller automatically adjusts the steering system to cause the bale wrapping machine to follow the selected route as wrapped bales are deposited onto a surface.

10. The guided wrapping machine of claim 1, wherein the wrapping assembly further comprises:
    a power source that rotates the outer hoop relative to the inner hoop.

11. The guided wrapping machine of claim 1, further comprising a ram, wherein the ram is configured to advance the bale along the platform.

12. The guided wrapping machine of claim 11, wherein advancement of the bale along the platform by the ram advances the guided wrapping machine along the ground.

13. A method for arranging a series of wrapped bales in a desired configuration, the method comprising:
    wrapping a series of bales using a bale wrapping machine, the bale wrapping machine comprising an extendable ram;
    extending the ram to advance the bale wrapping machine along a selected route while depositing the series of wrapped bales onto a surface; and
    controlling an actuator of a steering system of the bale wrapping machine to cause the wrapping machine to follow the selected route using received geospatial positioning information.

14. The method of claim 13, further comprising receiving the geospatial positioning information via a global navigation satellite system (GNSS) receiver.

15. The method of claim 14, wherein the bale wrapping machine comprises a controller, and wherein the controller is communicably coupled to the steering system of the bale wrapping machine and the GNSS receiver.

16. The method of claim 13, wherein controlling a steering system of the bale wrapping machine to follow the selected route using received geospatial positioning information comprises controlling a steering system to cause the bale wrapping machine to follow the selected route.

17. The method of claim 16, wherein controlling a steering system of the bale wrapping machine to follow the selected route comprises actuating an actuator to alter a steering angle of a wheel of the bale wrapping machine.

18. The method of claim 16, wherein controlling a steering system of the bale wrapping machine to follow the selected route comprises:
   comparing a current position of the bale wrapping machine to the selected route; and
   actuating an actuator to alter a steering angle of a wheel of the bale wrapping machine to change a direction of travel of the bale wrapping machine when the current position compares unfavorably to the selected route.

19. The method of claim 13, wherein the bale wrapping machine comprises a controller, and wherein controlling an actuator of a steering system of the bale wrapping machine to cause the wrapping machine to follow the selected route using received geospatial positioning information comprises utilizing the controller to automatically control the steering system of the bale wrapping machine.

20. The method of claim 13, wherein extending the ram to advance the bale wrapping machine along a selected route while depositing the series of wrapped bales onto a surface comprises simultaneously advancing a bale along a platform of the bale wrapping machine.

21. The method of claim 13, wherein wrapping a series of bales using a bale wrapping machine occurs simultaneously with advancing the bale wrapping machine along a selected route while depositing the series of wrapped bales onto a surface.

* * * * *